United States Patent
Do et al.

(10) Patent No.: US 6,775,076 B2
(45) Date of Patent: Aug. 10, 2004

(54) MICRO OPTICAL BENCH FOR MOUNTING PRECISION ALIGNED OPTICS, OPTICAL ASSEMBLY AND METHOD OF MOUNTING OPTICS

(75) Inventors: Khiem Do, Santa Clara, CA (US); John E. Sell, Santa Clara, CA (US); Raymond Kono, Santa Clara, CA (US); Dyan Seville-Jones, Santa Clara, CA (US); Rodrigo de la Torro, Santa Clara, CA (US); William J. Kozlovsky, Santa Clara, CA (US); Bal Gupta, Santa Clara, CA (US); David Ross Pace, Santa Clara, CA (US); William B. Chapman, Santa Clara, CA (US); Kevin Sawyer, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/173,571

(22) Filed: Jun. 15, 2002

(65) Prior Publication Data

US 2003/0231835 A1 Dec. 18, 2003

(51) Int. Cl.[7] .................................................. G02B 7/02
(52) U.S. Cl. ............................................................ 359/819
(58) Field of Search ................................... 359/819, 821, 359/811, 808; 385/92, 93

(56) References Cited

U.S. PATENT DOCUMENTS

| 6,172,822 | B1 | * | 1/2001 | Belliveau et al. ........... 359/819 |
| 6,594,092 | B2 | * | 7/2003 | von Freyhold et al. ..... 359/819 |
| 2002/0172239 | A1 | | 11/2002 | McDonald et al. |
| 2003/0231666 | A1 | | 12/2003 | Daiber et al. |
| 2003/0231669 | A1 | | 12/2003 | Kozlovsky et al. |

OTHER PUBLICATIONS

Pace, David R. et al., "Mount Having High Mechanical Stiffness and Tunable External Cavity Laser Assembly Including Same", U.S. Patent Application, Ser. No. 10/173, 546, filed Jun. 15, 2000.

* cited by examiner

*Primary Examiner*—Ricky Mack
(74) *Attorney, Agent, or Firm*—Blakely, Sokoloff, Taylor & Zafman LLP

(57) ABSTRACT

A micro optical bench for mounting precision aligned optics thereon, and an assembly of precision aligned optical components mounted on an micro optical bench.

39 Claims, 2 Drawing Sheets

MICRO OPTICAL BENCH FOR MOUNTING PRECISION ALIGNED OPTICS, OPTICAL ASSEMBLY AND METHOD OF MOUNTING OPTICS

BACKGROUND OF THE INVENTION

There is an increasing demand for tunable lasers for test and measurement uses, wavelength characterization of optical components, fiberoptic networks and other applications. In dense wavelength division multiplexing (DWDM) fiberoptic systems, multiple separate data streams propagate concurrently in a single optical fiber, with each data stream created by the modulated output of a laser at a specific channel frequency or wavelength. Presently, channel separations of approximately 0.4 nanometers in wavelength, or about 50 GHz are achievable, which allows up to 128 channels to be carried by a single fiber within the bandwidth range of currently available fibers and fiber amplifiers. Greater bandwidth requirements will likely result in smaller channel separation in the future.

DWDM systems have largely been based on distributed feedback (DFB) lasers operating with a reference etalon associated in a feedback control loop, with the reference etalon defining the ITU wavelength grid. Statistical variation associated with the manufacture of individual DFB lasers results in a distribution of channel center wavelengths across the wavelength grid, and thus individual DFB transmitters are usable only for a single channel or a small number of adjacent channels.

Continuously tunable external cavity lasers have been developed to overcome the limitations of individual DFB devices. Various laser tuning mechanisms have been developed to provide external cavity wavelength selection, such as mechanically tuned gratings used in transmission and reflection. External cavity lasers must be able to provide a stable, single mode output at selectable wavelengths, while effectively suppressing lasing associated with external cavity modes that are within the gain bandwidth of the cavity.

The mechanical design of precision aligned optical assemblies, including external cavity laser optics, is an important factor in providing reliable performance of such assemblies. The optical components must be precisely aligned and mounted in a way that will maintain these components within allowable tolerances in order to function satisfactorily. Current mounting techniques often provide inadequate structural strength in the joints fixing the components to a support, allowing unpredictable shifts in the relative positions of the components. What is needed is a mount which will accommodate alignment tolerances for optical attachment of optical components, control positional shifts within a tolerable range, provide sufficient mechanical stability and limited thermal induced deformation and stress of the components mounted thereon, while still allowing ready access to the optical components.

The present invention satisfies these needs, as well as, others, and overcomes deficiencies found in the background art.

BRIEF DESCRIPTION OF THE DRAWINGS

The invention will be more fully understood by reference to the following drawings, which are for illustrative purposes only.

DETAILED DESCRIPTION OF PREFERRED EMBODIMENTS

The present invention relates to a micro optics support comprising a rigid unitary mount base having a substantially planar upper surface with an elongated support extending therefrom. The elongated support has a contact surface being shaped as a portion of an inner surface of a cylinder or other curved surface which may be semi-elliptical, micro-stepped or otherwise configured to provide an enhanced bonding surface area with components mounted thereto and to provide increase structural stability of the mounted components. An additional support or cradle having a curvilinear mounting surface may be formed at a spaced distance from the elongated support for mounting one or more components, and a gap formed between the paced supports may be dimensioned for mounting a gain element thereon. Additionally, the gain element is typically mounted to a support element prior to mounting to the mount base.

Figure 1:
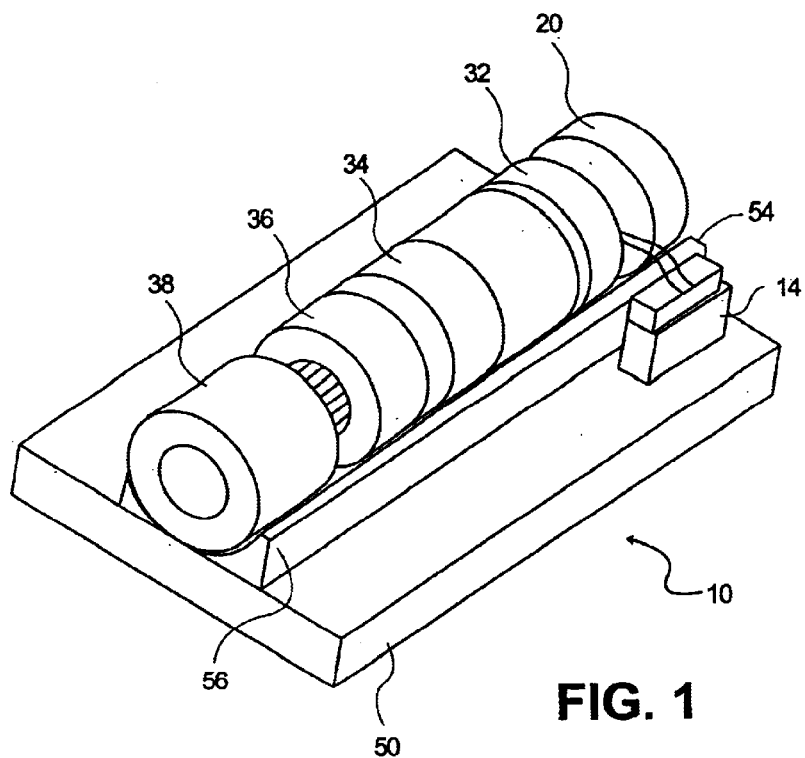
FIG. 1 is a perspective view of an optical assembly mounted on a micro optical support in accordance with the present invention.
Figure 2:
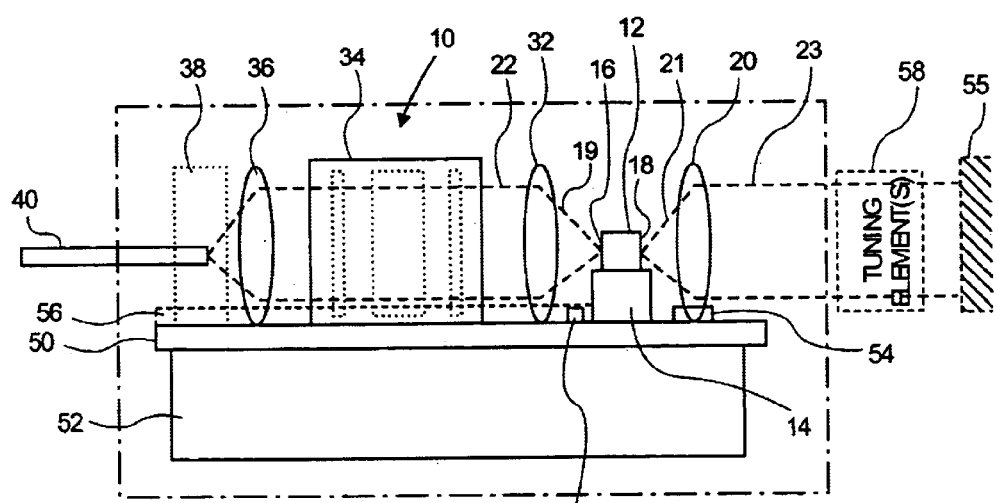
FIG. 2 is a schematic representation of the assembly shown in FIG. 1, with additional components for making a tunable external cavity laser apparatus shown in phantom.
Figure 3:
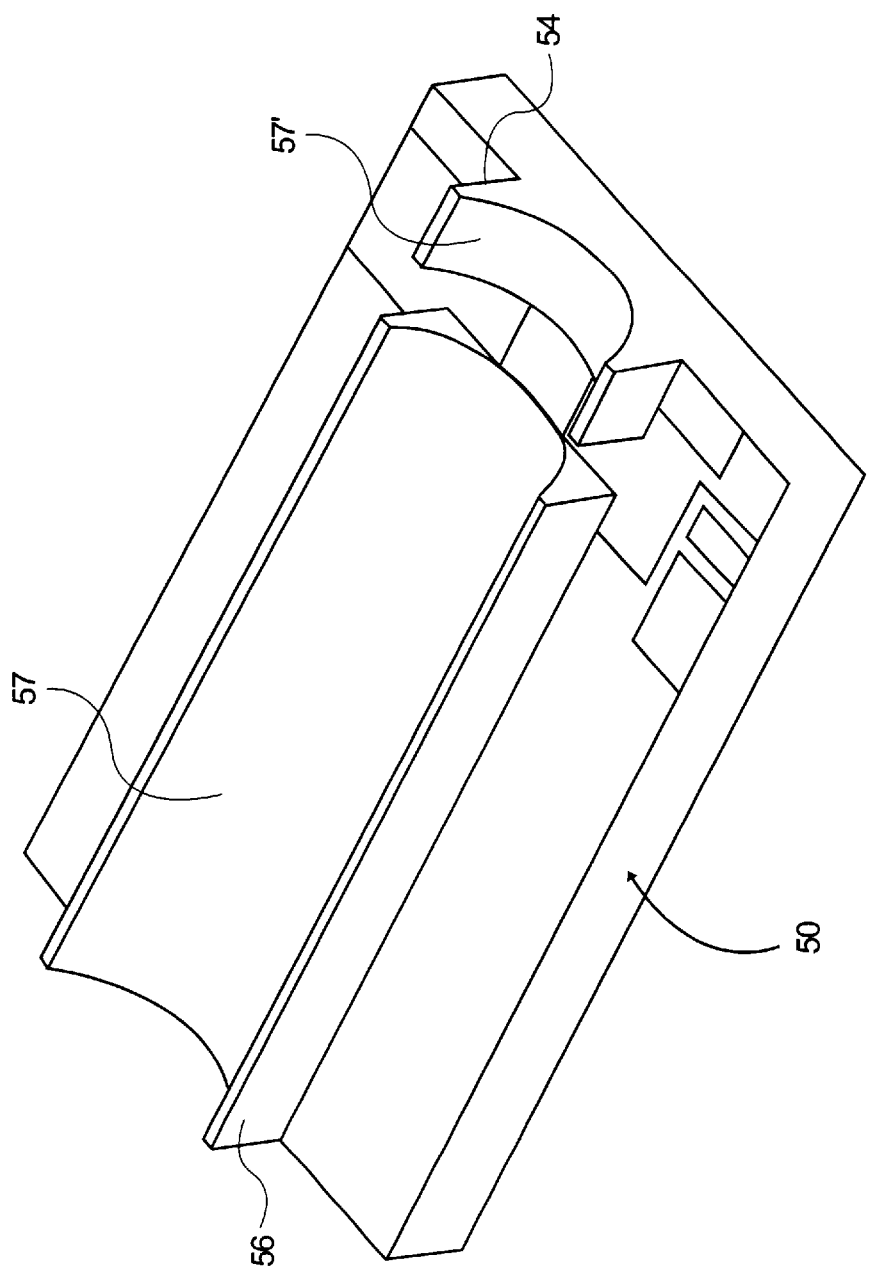
FIG. 3 is a perspective view of a micro optical support according to the present invention.

Referring more specifically to the drawings, for illustrative purposes the present invention is embodied in the apparatus shown in FIGS. 1 through 3. It will be appreciated that the apparatus may vary as to configuration and as to details of the parts, and that the method may vary as to details and the order of the acts, without departing from the basic concepts as disclosed herein. The invention is disclosed primarily in terms of use with an external cavity laser. The invention, however, may be used with various types of laser devices and optical systems. It should also be understood that the terminology used herein is for the purpose of describing particular embodiments only, and is not intended to be limiting, since the scope of the present invention will be limited only by the appended claims. The relative sizes of components and distances therebetween as shown in the drawings are in many instances exaggerated for reason of clarity, and should not be considered limiting.

The current invention can be used generally for precision mounting a series of small optical elements or components on a stable platform. Although the examples shown in the figures are to precision mounting of optical components on a stable platform for use in an external cavity laser apparatus, these are only examples of the utility of the present invention, and are not to be considered in a limiting way.

Referring now to FIG. 1, there is shown an optical assembly 10 which may form a part of an external cavity laser apparatus. Assembly 10 includes a rigid, unitary mounting base 50 to which the optical components of the assembly are rigidly mounted. As shown, mounting base 50 is a thermally conductive substrate having a first lens/collimator 20, gain medium 12 (see FIG. 2) and an optical output assembly mounted thereon. The thermally conductive substrate 50 is engineered to have high thermal conductivity and a coefficient of thermal expansion that is matched to at least that of the rigid mounting element 14 on which gain medium 12 is mounted. The gain medium 12, collimator 20 and the components of the optical output assembly are temperature sensitive components, and mounting of these components on a common substrate having a high coefficient of thermal conductivity allows for selective and accurate temperature control and cooling of the components of the output assembly.

Mount base 50 is a unitary piece of highly stiff or rigid material, such as aluminum nitride or copper-tungsten, or other metal nitrides or metal carbides that provide good thermal conductivity and a relatively small coefficient of thermal expansion, generally having a thickness of about 1–2 mm, for example. Base 50 may be thermally controlled by a thermal electric controller 52, (preferably a single thermal electric controller) which is in thermal communication with the underside of base 50. Thermal electric controller 52 is operatively coupled to base 50 to provide heating and cooling to base 50 via thermal conduction, as well as to the components that are thermally coupled thereto. Thermal electric controller 52 is operatively coupled to a controller (not shown), which may comprise a conventional data processor, and provides signals to thermal electric controller for thermal adjustment or for maintaining a constant operating temperature of base 50 and optical assembly 10.

Base 50 and/or any or all of the components mounted thereto, may also include one or more temperature monitoring elements 51 operatively coupled to the controller that can monitor the base (or component) temperature and provide feedback to the controller so as to maintain the base 50 or other component at a desired temperature, or adjust the temperature as necessary.

Thermal control may be achieved by conduction, convection or both. In many embodiments, thermal conduction is the dominant pathway for heat flow and temperature adjustment, and convective effects, which may result in unwanted or spurious thermal fluctuation in one or more components, should be suppressed. The optical assembly 10 may be designed or otherwise configured to allow or compensate for the effects of heat flow by thermal convection, over the operational temperature of the arrangement. For example; the optical assembly 10 may be configured to restrict air flow near one or more of the components 20, 12, 32, 34, 36 and 38. Alternatively, one or more component may be individually isolated in low conductivity atmospheres or vacuum. Thermally insulating materials can also be used to suppress unwanted heat transfer to or from any component.

The design of the assembly 10 may additionally or alternatively be configured to provide laminar air or atmosphere flow proximate one or more components to avoid potentially deleterious thermal effects associated with turbulence.

In the example shown in FIG. 1, first lens/collimator 20 is securely mounted to the base. Collimator 20 may be provided with a cylindrical frame to provide a broader surface to be fixed to base 50. Further, base 50 is provided with a curvilinear support, saddle or cradle 54 that extends from the generally flat planar surface of the top of base 50. Cradle 54 may be formed as an integral portion of base 50 or may be mounted to base 50 using thermally conductive epoxy, solder which may have matching thermal coefficient of thermal expansion (i.e., "CTE matched"), or other means of affixation, such as by welding or mechanical means, for example. Cradle 54 is dimensioned to receive collimator 20 or its cylindrical frame, and has a matching radius of curvature to form a conforming fit therewith. A tolerance (e.g., of about 0.001") may be provided between the collimator/frame 20 and cradle 54 to accommodate the volume of epoxy, when epoxy is used to fix the collimator 20 to base 50.

The solder, adhesive or other attachment material, it should be noted, only needs to be thermally conductive where high heat transfer is required. Since the diode gain medium 12 is generating heat, all the attachment related to the gain medium should be thermally conductive to avoid large temperature gradients. Other components that do not have a strong source of heating or cooling, such as lens 20, do not need to be attached with a thermally conducive material due to the low heat transfer involved with such components.

The use of CTE matched adhesive, solder or material for attachment of components may be advantageous in situations where a bond-line is relatively large. However, where the bond line for adjacent components is relatively thin, a CTE mismatch may be tolerated. Adhesives used with the invention may include a, solid filler to reduce shrinkage during cure, or over the lifetime of the bond. Such fillers may comprise, for example, solid particles of materials such as alumina, aluminum nitride, silica, or other metal oxides, nitrides, carbides or mixtures thereof.

An optical output assembly is mounted to base 50 adjacent the second side of the gain medium 12. In the example shown in FIG. 1, the optical assembly includes a second lens/collimator 32, an optical isolator 34, a focus lens or lens assembly 36 and a fiber ferrule 38. Each of these components may have a cylindrical periphery, or may be provided with a cylindrical frame so that they can all be securely fixed within a support 56 that extends from the generally planar surface of base 50. Support 56 may be formed as a "half-pipe" as shown, or to have some other fraction of a cylindrical surface to support the components or otherwise be configured to support the components.

Support 56 may be formed as an integral portion of base 50 or may be mounted to base 50 using thermally conductive epoxy, solder, or other means of affixation, such as by welding or mechanical means, for example. Support 56 is dimensioned to receive second lens/collimator 32, optical isolator 34, focus lens or lens assembly 36 and fiber ferrule 38 (or their frames, if one or more are contained in a frame), and has a matching radius of curvature to form a conforming fit therewith. A tolerance (e.g., of about 0.001") may be provided between each component and support 56 to accommodate the volume of epoxy, when epoxy is used to fix the components thereto.

The half-pipe or partial cylindrical surface of support 56 provides a large "wrap around" contact area with the components that are fixed thereto. This enlarged surface contact area allows for rotation of the components about the optical axis during the initial setting of the components. The continuity of the support 56 allows translational adjustments of the components along the optical axis during setting of the components, so that full contact with the support is assured even if a component has to be shifted somewhat from its original, placement to ensure alignment (i.e., bond line adequate to allow for fine adjustment). Support 56 provides for a large bonded area (relative to bonding components to a flat base) and uniform bond joint thickness, owing to the conforming curvature of the support 56.

In addition to the added strength provided the bond joint by the simple increase in bonding contact surface, the height of the bond is increased by the extension of the support 56 from base 50 as it wraps around the components. The height of the bond provides additional strength and stiffness to resist bending and torsional moments acting on the components during shock. The half-pipe or partial tubular surface of support 56 helps contain the structural adhesive used to bond the components thereto, in examples where adhesive is the bonding agent, and helps maintain a uniform spreading of the adhesive. The uniform bond joints which are facilitated by support 56 make shifts caused by shrinkage occurring during the curing of the adhesive consistent in both direction and magnitude, thereby maintaining relative distances and positioning of the components (i.e., uniform bond line for consistent lens shift).

The contact surface of support 56, as well as the surfaces of the components to be fixed thereto, may be roughened 57 for further increase the surface area of bonding and to increase the strength of the bonds established between the components and the support 56. Roughening may be accomplished by bead blasting, for example, or with a cutting tool which leaves scratches in the surface of the support 56 as it is machined, or by shaping with a wire EDM, molding or casting. The optical components (i.e., carriers or frames supporting the components which are to make contact with the support) may also be bead blasted, surface roughened with a cutting tool, shaped with a wire EDM, molded or cast.

Although the components are generally bonded to support 56 using a structural adhesive, such as a thermally conducting epoxy, for example, this need not be the case. For example, one or more, or all of the components can be soldered to support 56, such as with a solder. While providing additional structural strength and support to the components, the open design of support 56, whether formed as a half-pipe or some other portion of a cylinder, allows access to the components fixed thereto even after mounting is complete. Base 50, as described, is useful not only in precision mounting optical components of an optical assembly for use in an external cavity laser for optical telecommunications, but is useful for precision mounting a series of small optics on a stable platform, where needed for any other general application.

For use in an external cavity laser system, however optical assembly 10 may cooperate with an end reflector 55 (shown in phantom in FIG. 2) and one or more tuning elements 58 (also shown in phantom in FIG. 2). In this way, an external laser cavity is delineated by a rear facet 18 of gain medium 12 and end reflector 54. Gain medium 12 emits a first coherent light beam 19 from front facet 16 that is collimated by lens/collimator 32 to define an optical path 22. Gain medium 12 also emits a second coherent beam 21 from the rear facet 18, which is collimated by lens/collimator 20 to form a second optical path 23. Tuning element(s) 58 is/are positioned within the external cavity between the end reflector 55 and facet 18 and aligned with the optical path 23. Tuning element(s) 58 is/are operable to preferentially feed back light of a selected wavelength to gain medium 12 during operation of the laser apparatus. For exemplary purposes, tuning element(s) 58 may include one or more Fabry-Perot etalons, or other etalons that may comprise parallel plate solid, liquid or gas spaced etalons, for example. Further descriptions of tuning elements that may be employed and the operations thereof are included in co-pending commonly assigned application Ser. No. 10/173, 546, titled "Mount Having High Mechanical Stiffness and Tunable External Cavity Laser Assembly Including Same", filed Jun. 15, 2002, and in co-pending commonly assigned application Ser. No. 10/099,649, titled "Tunable External Cavity Laser", filed Mar. 15, 2002, both of which are incorporated herein, in their entireties, by reference thereto.

Upon feeding back light of a selected wavelength from tuning elements(s) 58 to gain medium 12 during operation of the laser apparatus, the gain medium 12 begins to lase at the wavelength of the peak at which the energy which is fed back from the tuning element(s) 58 is/are focused at, and a high powered beam at the selected wavelength is emitted from facet 16 as an output to collimator 32. Collimator 32 directs the lasing energy along the second optical path 22 to optical isolator 34 to provide optimum feedback suppression (isolation) at a single wavelength or a small wavelength range only. Further details describing an optical isolator can be found in co-pending, commonly owned application (Ser. No. 10/173,355) titled "External Cavity Laser Apparatus and Methods" filed concurrently herewith, and incorporated herein, in its entirety, by reference thereto.

The isolated beam then travels along optical path 22 to fiber focusing lens 36, which focuses the beam for output to an optical fiber 40 via fiber ferrule 38. The arrangement described may be modified, as other arrangements are often used for making an external cavity laser system. For example, a beam splitter can be introduced between isolator 34 and focusing lens 36 to create an additional optical path that may be used to monitor power, or channel locking for example. Also various arrangements of collimators, lenses, etc., with or without an isolator could be substituted.

Gain medium 12 (and facets 16, 18) represent alignment-sensitive optical surfaces for which placement is critical. Although many, if not all of the components in the assembly are alignment-sensitive, placement of the gain medium 12 (and hence, the facets 16 and 18) are particularly critical as to their spancing, as this is what defines the length of the external cavity (along with the reflector 55), as described above. For these reasons, the mounting element (e.g., "dog bone" mounting element) 14 is soldered to the base 50, using a solder that may be CTE (coefficient of thermal expansion)-matched to the mounting element 14. The mounting element 14 may also be made of the same material as the base 50, or a material that is CTE matched with the material of the base 50. For example, mounting element 14 may comprise aluminum nitride, stainless steel or copper-tungsten, or other metal nitrides or metal carbides that provide good thermal conductivity and a relatively small coefficient of thermal expansion. By using solder, there is more assurance of retaining the exact positioning of the mounting element on base 50, whereas epoxy or othe means of attachment increase the risk kof shifting of the component after placing it, such as during curing of the adhesive, for example.

The gain medium 12 is mounted on the mounting element 14 prior to placing and soldering the element 14 to the base 50. The medium 12 may be coupled to the mounting (e.g., dog bone) element 14 by a thermally conductive adhesive or solder which may be CTE-matched to the gain medium 12 and/or element 14. A further description of a dog bone element and its functions can be found in commonly owned co-pending application, application Ser. No. 10/173,545, titled "Chip Carrier Apparatus", which was filed on Jun. 15, 2002, and which is incorparated herein, in its entirety, by reference thereto.

A series of optics, as described above are next mounted to support 56 using a structural adhesive, such as a thermally conductive epoxy, for example. Alternatively, one or more of these optical components may be soldered to support 56 as also described above. The half-pipe or partial cylindrical channel provided by support 56 provides for a large bonded area on each component and uniform bond joint thickness. The height that the bond extends to provides additional mechanical strength to provide resistance to moments acting on the components during shock. The curved mounting surface of the support helps contain the structural adhesive to result in uniform spreading of the adhesive. The bond symmetry helps to limit shifts in all directions except one.

Collimator 20 is similarly mounted to support 54, which also has a curved bonding surface that helps to contain the adhesive during bonding, provides a bond that extends away from the surface of support 50 to provide enhanced mechanical strength to resist torsion and bending moments, and enables a more uniform bond. Support 54 is spaced from support 56 to provide a substantially flat planar surface between the supports on which the mounting element 14 is mounted.

Support 54 is constructed similarly to support 56 but with a reduced length dimension as it is designed to support fewer components, in this example only collimator 20. The collimator 20 may have a cylindrical periphery, or may be provided with a cylindrical frame so that it can be securely fixed within support 54 with a maximum of surface contact area to maximize the bond or fixation of the collimator 20 to the support 54. Support 54 extends from the generally planar surface of base 50. Support 54 may be formed as a "half-pipe" as shown, or to have some other fraction of a cylindrical surface to support the collimator 20.

Support 54 may be formed as an integral portion of base 50 or may be mounted to base 50 using thermally conductive epoxy, CTE matched solder, or other means of affixation, such as by welding or mechanical means, for example. Support 54 is dimensioned to receive collimator 20 and has a matching radius of curvature to form a conforming fit therewith. A tolerance (e.g., of about 0.001") may be provided between collimator 20 and support 54 to accommodate the volume of epoxy, when epoxy is used to fix the collimator 20 to support 54.

The half-pipe or partial cylindrical surface of support 54 provides a large "wrap around" contact area with the collimator 20 when fixed thereto. This enlarged surface contact area allows for rotation of the collimator about the optical axis during the initial setting thereof. The support 54 may have a length dimension that is greater than the length of the collimator 20, thereby allowing translational adjustments of the collimator 20 along the optical axis during setting thereof, so that full contact with the support 54 is assured even if the collimator 20 has to be shifted somewhat from its original placement to ensure alignment (i.e., bond line adequate to allow for fine adjustment). Support 54 provides for a large bonded area (relative to bonding the collimator 20 to a flat base) and uniform bond joint thickness, owing to the conforming curvature of the support 54.

In addition to the added strength provided the bond joint by the simple increase in bonding contact surface, the height of the bond is increased by the extension of the support 54 from base 50 as it wraps around the collimator 20. The height of the bond provides additional strength and stiffness to resist bending and torsional moments acting on the collimator 20 during shock. The half-pipe or partial tubular surface of support 54 helps contain the structural adhesive used to bond the component(s) thereto, in examples where adhesive is the bonding agent, and helps maintain a uniform spreading of the adhesive.

The contact surface of support 54, as well as the surfaces of the components to be fixed thereto, may be roughened 57' to further increase the surface area of bonding and to increase the strength of the bonds established between the collimator/component(s) and the support 54. Roughening may be accomplished by bead blasting, for example, or with a cutting tool which leaves scratches in the surface of the support 54 as it is machined, or by shaping with a wire EDM, molding or casting. The collimator 20 or other optical component(s), carrier(s) or frame(s) supporting the component(s) which are to make contact with the support 54 may also be bead blasted or surface roughened with a cutting tool, shaped with a wired EDM, molded or cast.

Although the collimator 20 is generally bonded to support 54 using a structural adhesive, such as a thermally conducting epoxy, for example, this need not be the case. For example, a collimator 20 or other component or components can be soldered to support 54, such as with a solder. While providing additional structural strength and support to the collimator 20, the open design of support 54, whether formed as a half-pipe or some other portion of a cylinder, allows access to the collimator 20 fixed thereto even after mounting is complete.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, process, process step or steps, or assembly, to the objective, spirit and scope of the present invention. All such modifications are intended to be within the scope of the claims appended hereto.

That which is claimed is:

1. A micro optics support comprising:
   a rigid unitary mount base having a substantially planar upper surface and an elongated support extending from said substantially planar surface; said elongated support having a curvilinear contact surface being adapted to receive optical components having substantially mating curvilinear surfaces.

2. The micro optics support of claim 1, wherein said contact surface of said elongated support is shaped as a portion of an inner surface of a cylinder.

3. The micro optics support of claim 1, wherein said elongated support is an integral portion of said rigid unitary mount base.

4. The micro optics support of claim 1, wherein said rigid unitary mount base, including said elongated support, comprise a material selected from the group consisting of aluminum nitride, copper tungsten, and aluminum oxide.

5. The micro optics support of claim 1, wherein said elongated support is fixed to said substantially planar surface.

6. The micro optics support of claim 5, wherein said elongated support comprises stainless steel.

7. The micro optics support of claim 1, further comprising a cradle extending from said substantially planar surface, said cradle being spaced from said elongated support and having a curvilinear support axially aligned with said elongated support and dimensioned to interface with a substantial portion of a peripheral surface of an optical element.

8. The micro optics support of claim 7, wherein said cradle is an integral portion of said rigid unitary mount base.

9. The micro optics support of claim 8, wherein said cradle comprises a material selected from the group consisting of aluminum nitride, copper tungsten, and aluminum oxide.

10. The micro optics support of claim 7, wherein said cradle is fixed to said substantially planar surface.

11. The micro optics support of claim 10, wherein said cradle comprises stainless steel.

12. The micro optics support of claim 7, further comprising a gain medium rigidly mounted between said elongated support and said cradle and optically aligned with said axial alignment between said elongated support and said cradle.

13. The micro optics support of claim 12, wherein said gain medium is mounted to a rigid support and said rigid support is rigidly fixed to said substantially planar upper surface.

14. The micro optics support of claim 1, further comprising a thermal electric controller thermally coupled to a lower surface of said rigid, unitary mount base.

15. The micro optics support of claim 2, wherein said elongated support is in the shape of a half pipe.

16. A micro optics assembly comprising:
- a rigid unitary mount base having a substantially planar upper surface and an elongated support extending from said substantially planar surface; said elongated support having a curvilinear contact surface; and
- a series of optical components having substantially mating curvilinear surfaces mounted in said elongated support.

17. The micro optics assembly of claim 16, wherein said contact surface of said elongated support is shaped as a portion of an inner surface of a cylinder.

18. The micro optics assembly of claim 17, wherein each said optical component has a cylindrical periphery or is mounted in a cylindrical frame.

19. The micro optics assembly of claim 16, wherein said contact surface of said elongated support is roughened to enhance bonding strength with an adhesive.

20. The micro optics assembly of claim 19, wherein said roughened contact surface is formed by bead blasting; a cutting tool, wire EDM shaping, molding or casting.

21. The micro optics assembly of claim 16, wherein said mating surfaces of said optical components are roughened to enhance bonding strength with an adhesive.

22. The micro optics assembly of claim 21, wherein said roughened surfaces are formed by bead blasting, a cutting tool, wire EDM shaping, molding or casting.

23. The micro optics assembly of claim 16, wherein said optical components are mounted to said elongated support with a structural adhesive.

24. The micro optics assembly of claim 23, wherein said structural adhesive comprises a thermally conductive epoxy.

25. The micro optics assembly of claim 16, further comprising a gain medium mounted rigidly mounted to said mount base adjacent said elongated support.

26. The micro optics support of claim 25, further comprising a gain medium rigidly mounted to said gain medium mount and optically aligned with said series of optical components.

27. The micro optics support of claim 25, wherein said gain medium mount is soldered to said mount base.

28. The micro optics support of claim 25, wherein said gain medium mount is dog bone shaped.

29. The micro optics support of claim 25, further comprising a cradle extending from said substantially planar surface adjacent said gain medium mount, said cradle having a curvilinear support axially aligned with said elongated support and dimensioned to interface with a substantial portion of a peripheral surface of an optical element.

30. The micro optics assembly of claim 29, further comprising an optical component rigidly fixed to said cradle.

31. A method of constructing a micro optics assembly comprising the steps of:
- providing a rigid unitary mount base having a substantially planar upper surface and an elongated support extending from the substantially planar surface, wherein the elongated support has a curvilinear contact surface;
- rigidly fixing a gain medium on the rigid unitary mount base; and
- bonding a series of optical components to the contact surface of the elongated support.

32. The method of claim 31, further comprising fixing the gain medium to a rigid gain medium support prior to fixing the gain medium to the rigid unitary mount base, and then rigidly fixing the rigid gain medium support to the substantially planar surface of the rigid unitary mount base.

33. The method of claim 32, wherein the rigid gain medium support is soldered to the rigid unitary mount base.

34. The method of claim 31, further comprising roughening the contact surface of the elongated support prior to bonding the series of optical components thereto.

35. The method of claim 34, wherein said roughening comprises cutting scratches into the contact surface with a cutting tool.

36. The method of claim 34, wherein said roughening is performed by bead blasting the contact surface.

37. The method of claim 31, further comprising roughening the contact surfaces of the optical components prior to bonding them to the elongated support.

38. The method of claim 31, wherein the rigid unitary mount base further includes a cradle extending from the substantially planar surface arranged so that the gain medium is positioned in between the elongated support and the cradle, said method further comprising the step of fixing an optical component in the cradle.

39. The method of claim 38 wherein the optical component is bonded to the cradle using a structural adhesive.

* * * * *